United States Patent [19]

Marsault et al.

[11] Patent Number: 4,679,755
[45] Date of Patent: Jul. 14, 1987

[54] SUPPORT DEVICE FOR THIN-WALLED TUBING

[75] Inventors: Jean-Jacques Marsault, Saint Arnoult en Yvelines; Jean-Pierre Peyrelongue, Pontchartrain; Jean-Claude Semedard, Paris; Gérard Vallee, Viroflay, all of France

[73] Assignee: Stein Industrie, France

[21] Appl. No.: 741,408

[22] Filed: Jun. 5, 1985

[30] Foreign Application Priority Data

Jun. 5, 1984 [FR] France .................. 84 08788

[51] Int. Cl.⁴ .............................................. F16L 3/08
[52] U.S. Cl. ...................... 248/74.1; 248/49; 248/65; 248/DIG. 1; 24/19; 24/205
[58] Field of Search ............ 248/74.1, 74.2, 65, 248/49, 73, 55, 64, DIG. 1, 67.7; 403/64, 65, 175; 285/61; 24/19, 205, 285

[56] References Cited

U.S. PATENT DOCUMENTS

| 1,663,866 | 3/1928 | Snapp | 24/19 |
| 2,730,612 | 1/1956 | Westendorf | 24/20.5 X |
| 2,942,127 | 6/1960 | Harse | 24/19 X |
| 3,606,218 | 9/1971 | Enlund et al. | 248/74.1 |
| 4,012,470 | 3/1977 | Thayer | 248/74.1 X |
| 4,101,117 | 7/1978 | East et al. | 248/49 X |
| 4,134,563 | 1/1979 | Pollono | 248/58 |
| 4,384,696 | 5/1983 | Blake | 248/DIG. 1 X |
| 4,485,994 | 12/1984 | Anglarset et al. | 248/DIG. 1 X |

FOREIGN PATENT DOCUMENTS 482629 12/1925 Fed. Rep. of Germany .
3001028 7/1981 Fed. Rep. of Germany ........ 248/55

Primary Examiner—Ramon O. Ramirez
Attorney, Agent, or Firm—Sughrue, Mion, Zinn, Macpeak, and Seas

[57] ABSTRACT

A support or fixing device for pipework having walls which are thin relative to its diameter and subjected to large temperature variations and to radial forces. The device comprises: (a) support cradles (2A, 2B, 2C, 2D) having an internal profile whose radius of curvature is close to that of the pipework; (b) a rigid half-collar (7) disposed around and spaced from the periphery of the pipework, and having some of the cradles fixed thereto; (c) two arms (5A, 5B) hinged at their ends to the half-collar and having others of the cradles fixed thereto; and (d) a flexible arm clamping device (9) resiliently applying the cradles against the pipework, independently of expansions and radial forces applied to the pipework.

6 Claims, 1 Drawing Figure

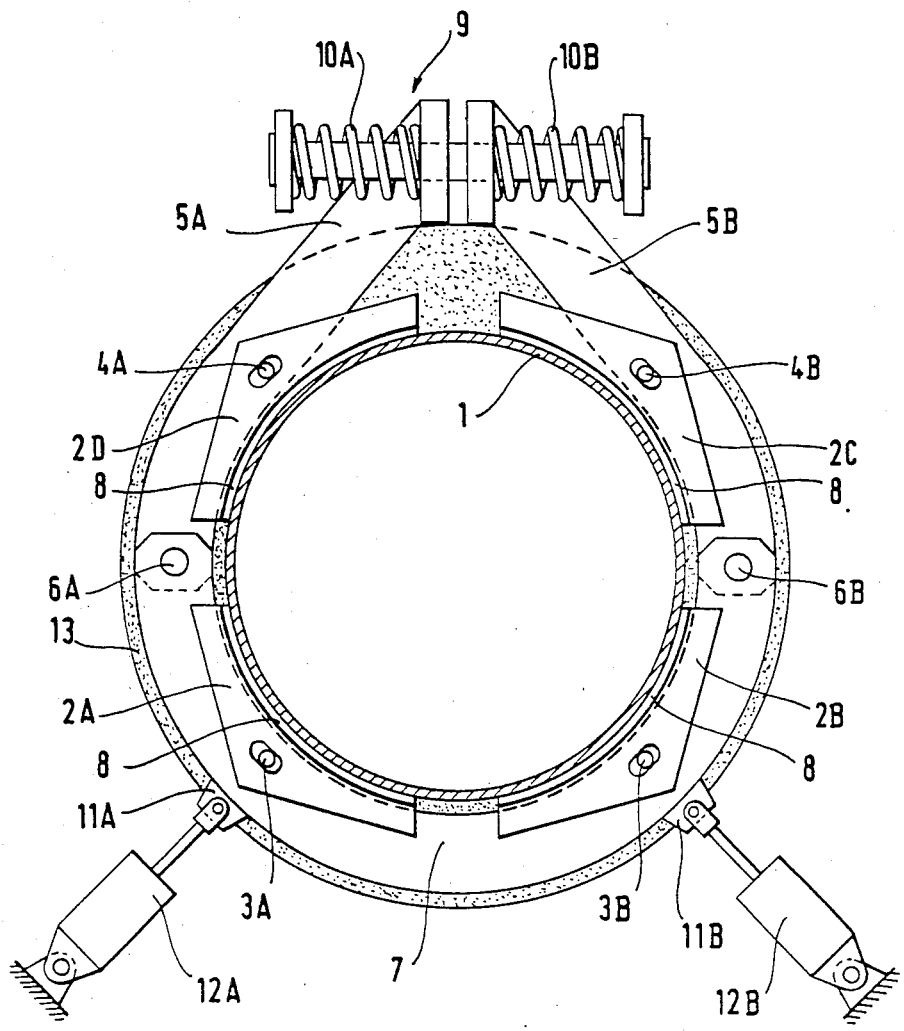

SUPPORT DEVICE FOR THIN-WALLED TUBING

The present invention relates to a support device for tubing having a wall thickness which is thin relative to its diameter, and subjected to large temperature variations and to radial forces in arbitrary directions.

BACKGROUND OF THE INVENTION

The Applicant has already proposed devices of this kind in published French patent specifications Nos. 2 443 001 and 2 499 202, which devices are suitable for supporting or fixing the pipework which transports liquid sodium in breeder reactor power stations, and which withstands seismic shocks. These devices include force pickup members welded to the pipework and constituted by circular pegs which engage in holes in resilient blades which are welded at least at one of their ends to radial bars which are fixed to a rigid collar surrounding the pipework. This requires a relatively high number of welds, such that installation is lengthy and expensive.

The aim of the present invention is to provide a support device for tubing whose walls are thin relative to the tubing diamter, which holds the tubing without play and without applying excessive stresses thereto, regardless of the diametral expansions and forces applied, without requiring force take-up devices welded to the pipework, which is easily and rapidly put into place, which enables the pipework to be lagged against heat losses even where the support is disposed, and which allows the degree to which the pipework is clamped to be adjusted.

SUMMARY OF THE INVENTION

A device according to the invention is characterized in that it comprises:

a/ support cradles having an internal profile with a radius of curvature close to that of the pipework;

b/ a rigid half-collar disposed around and spaced from the periphery of the pipework and on which some of the cradles are fixed;

c/ two arms hinged to the ends of the half-collar and having the other cradles fixed thereto; and d/ a flexible arm clamping device resiliently applying the cradles against the pipework, independently of diametral expansions and radial forces applied to the pipework.

The support preferably includes at least one of the following characteristics:

the radius of curvature of the internal profile of the cradles is slightly greater than the radius of curvature of the pipework when cold;

the cradles are covered on their pipework-contacting faces in a layer of material which is heat-resistant and which is capable of being crushed elastically;

the material capable of being crushed elastically is a compressed knit of fine metal wire;

the cradles are pivotably fixed to the rigid half-collar and to the hinged arms;

the cradles, the half-collar and the major portion of the hinged arms are disposed inside thermal lagging surrounding the pipework, and the flexible clamping device is disposed outside said thermal lagging; and the rigid half-collar is connected via links to static support members or to members which lock automatically in the event of fast displacement, but which allow slow displacements to take place.

There follows a description by way of example with reference to the sole figure of the accompanying drawing which shows a support device for pipework for transporting molten metal, such as sodium, in an electricity power station having a breeder reactor. It is known that the temperature of such pipework can vary very rapidly, by 100° or 200° C. in a few minutes.

BRIEF DESCRIPTION OF THE DRAWING

The FIGURE shows the device in diametral sections (on a right cross-section of the pipework).

DESCRIPTION OF THE PREFERRED EMBODIMENT

The large diameter pipework 1 has a diameter of about 700 mm to 1000 mm, and has thin walls which are 10 mm to 20 mm thick. It is clamped between four cradles 2A, 2B, 2C and 2D which are regularly distributed around its periphery, and which have a radius of curvature which is slightly greater than the radius of curvature of the pipework when cold and which may be equal to the maximum radius of the pipework when hot. The lower cradles 2A and 2B are fixed via pivots 3A and 3B to a rigid half-collar 7. The other two cradles 2C and 2D are fixed via pivots 4A and 4B to two arms 5A and 5B which are hinged at 6A and 6B to the rigid half-collar 7. All of the cradles are covered on their pipework-facing faces, in a layer 8 of material which is heat-resistant and which is capable of elastic crushing, such as a compressed knit of fine stainless steel wire which withstands 500° C. while retaining its properties.

Spring members 10A, 10B urge the hinged arms towards each other and serve to apply the cradles 2C and 2D against the pipework with a determined force.

Links 11A and 11B fixed to the rigid half-collar 7 serve to fasten said collar to self-locking devices 12A and 12B which may be hydraulic or mechanical.

The pipework is surrounded by heat insulating lagging 13 in which the cradles, the half-collar, and the major portion of the arms 5A and 5B are received, leaving only the clamping member 9 outside the lagging.

It can be seen that if the clamping springs 10A and 10B are suitably rated, forces are rapidly transmitted between the pipework 1 and the self-locking devices 12A and 12B, which constitute snubbers preventing radial shifting of the rigid half-collar 7 while providing slow radial shifting of the rigid half-collar whereby the snubbers lock in the event of fast radial displacement, but which allow slow displacements to take place. If the pipework expands or contracts radially due to a change in the temperature of the liquid metal flowing therethrough, the pipework continues to be held rigidly and without play, while remaining protected from excessive clamping due to the resilience of the springs.

The freedom of the cradles 2A and 2B to pivot about the pivots 3A and 3B enables centered contact to be retained between the pipework and the cradles regardless of the alterations in pipework shape and the small thermal deformations which may occur in the half-collar 7. In addition, by placing the four cradles at 90° to one another, any tendency of the pipework to become oval under the clamping force is compensated.

Although the device which has just been described with reference to the figure in the drawing appears to be the preferred embodiment of the invention, it will be understood that various modifications may be made thereof without going beyond the scope of the invention, with various members being replaceable by others which perform an analogous technical function. In particular, the number of cradles may be modified, with the minimum number being two. The half-collar could occupy a fraction of the peripheray of the pipework which is greater than or less than 180°. The number of hinged arms could be greater than two, and could even be an odd number. The clamping springs could be replaced by spring washers of the "Belleville" type.

We claim:

1. A fixing device for a pipework (1) having a cylindrical wall which is thin relative to its diameter and subjected to large temperature variations and to radial forces in arbitrary directions, said device comprising:
   a. sectional support cradles (2A, 2B, 2C, 2D) having pipework contacting faces;
   b. a rigid half-collar (7) for disposal around the periphery of the pipework, and having some of the cradles mounted thereto;
   c. two arms (5A, 5B) hinged at their ends to respective ends of the half-collar and having others of the cradles mounted thereto; and
   d. a flexible arm clamping device (9) resiliently mounted to said two arms for drawing said arms together to apply the cradles against the pipework, independently of expansions and radial forces applied to the pipework.

2. A device according to claim 1, further comprising a layer of material which is heat-resistant and capable of elastic crushing covering the cradles on their pipework contacting faces.

3. A device according to claim 2, wherein said material is a compressed knit of a fine metal wire.

4. A device according to claim 1, wherein said cradles are respectively pivoted (3A, 3B, 4A, 4B) to the rigid half-collar (7) and to the hinged arms (5A, 5B).

5. A device according to claim 1, wherein said arms include major portions pivoted to said half-collar and said device further comprises thermal lagging (13) for surrounding the pipework, the cradles and the half-collar, and the major portions of the hinged arms are disposed inside said thermal lagging and the flexible clamping device is disposed outside said lagging.

6. A device according to claim 1, wherein the rigid half-collar is connected via dual links (11A, 11B) to respective means (12A, 12B) for preventing rapid radial shifting of said rigid half-collar while providing slow radial shifting of said rigid half-collar for locking said half-collar automatically in the event of rapid displacement, but allowing slow displacement of said rigid half-collar relative to said pipework by forces transmitted from said pipework to said rigid half-collar.

* * * * *